United States Patent
Rinnan (10) Patent No.: US 9,290,239 B2
(45) Date of Patent: Mar. 22, 2016

(54) CONTROL DEVICE FOR POSITIONING AN INSTRUMENTED CABLE PROVIDED WITH BUOYANCY MEANS FOR RETRIEVING THE CONTROL DEVICE AND INSTRUMENTED CABLE FROM SUBMERGED POSITIONING

(71) Applicant: Kongsberg Seatex AS, Trondheim (NO)

(72) Inventor: Arne Rinnan, Ranheim (NO)

(73) Assignee: Kongsberg Seatex AS, Trondheim (NO)

( * ) Notice: Subject to any disclaimer, the term of this patent is extended or adjusted under 35 U.S.C. 154(b) by 196 days.

(21) Appl. No.: 13/768,384

(22) Filed: Feb. 15, 2013

(65) Prior Publication Data

US 2013/0213291 A1 Aug. 22, 2013

(30) Foreign Application Priority Data

Feb. 16, 2012 (NO) .................................. 20120164

(51) Int. Cl.
*G01V 1/38* (2006.01)
*G01V 1/20* (2006.01)
*B63B 21/66* (2006.01)

(52) U.S. Cl.
CPC ............... *B63B 21/66* (2013.01); *G01V 1/201* (2013.01); *G01V 1/3826* (2013.01); *G01V 1/3835* (2013.01); *G01V 2001/207* (2013.01)

(58) Field of Classification Search
USPC .......................................................... 701/21
See application file for complete search history.

(56) References Cited

U.S. PATENT DOCUMENTS

| | | | | |
|---|---|---|---|---|
| 3,673,556 | A * | 6/1972 | Biggs | 367/18 |
| 4,033,278 | A * | 7/1977 | Waters | 114/245 |
| 4,583,206 | A * | 4/1986 | Rialan et al. | 367/78 |
| 4,635,237 | A * | 1/1987 | Benestad et al. | 367/20 |
| 5,404,339 | A * | 4/1995 | Cole, Jr. | 367/16 |
| 6,932,017 | B1 * | 8/2005 | Hillesund et al. | 114/244 |
| 7,701,803 | B2 * | 4/2010 | Welker | 367/17 |
| 2006/0227657 | A1 * | 10/2006 | Tveide et al. | 367/16 |
| 2008/0008032 | A1 * | 1/2008 | Welker | 367/16 |
| 2008/0025146 | A1 * | 1/2008 | Welker | 367/20 |

FOREIGN PATENT DOCUMENTS

WO    2011014071 A2    2/2011

OTHER PUBLICATIONS

Norwegian Search Report dated Sep. 14, 2012.

* cited by examiner

*Primary Examiner* — Shelley Chen
(74) *Attorney, Agent, or Firm* — Alix, Yale & Ristas, LLP (57) ABSTRACT

Control device (10, 20) for controlling the position of an instrumented cable towed in water, such as a marine seismic streamer, and/or an instrumented towed cable array (streamer array), which control device (10, 20) is provided with buoyancy means (30) for retrieving the control device (10, 20) and instrumented cable to the surface, at least sections of the instrumented cable, which means (30) are arranged for providing the control device (10, 20) with buoyancy.

17 Claims, 6 Drawing Sheets

CONTROL DEVICE FOR POSITIONING AN INSTRUMENTED CABLE PROVIDED WITH BUOYANCY MEANS FOR RETRIEVING THE CONTROL DEVICE AND INSTRUMENTED CABLE FROM SUBMERGED POSITIONING

CROSS REFERENCE TO RELATED APPLICATION

This application claims priority from Norwegian Patent Application No. 20120164, filed Feb. 16, 2012, the entire content of which is hereby incorporated by reference.

BACKGROUND

The invention relates to a control device for positioning an instrumented cable provided with buoyancy means for retrieving the control device and the instrumented cable from submerged position. Especially the invention is related to a control device provided with buoyancy means for buoyantly lifting the control device and the instrumented cable to the surface.

A seismic instrumented cable (streamer) is an elongate cable like structure (often up to several thousand meters long), which comprises an array of hydrophone cables and associated with electric equipment along its length, and which is used in marine seismic surveying. In order to perform a 3D/4D marine seismic survey, a plurality of such instrumented cables is towed behind a seismic survey vessel. Acoustic signals produced by the seismic sources are directed down through the water and into the seabed beneath, where they are reflected from the various strata. The reflected signals are received by the hydrophones, and next digitized and processed to build up a representation of the earth strata in the area being surveyed.

The instrumented cables are typically towed at a constant depth of about five to ten meters, in order to facilitate the removal of undesired "false" reflections from the water surface. In order to keep the instrumented cables at a constant depth, control devices known as "birds" are attached to each instrumented cable at intervals of 200 to 300 meters.

There exist many types of control devices, e.g. as described in U.S. Pat. No. 6,011,752 and U.S. Pat. No. 6,671,223. Other examples of birds are NO20092577, NO20092575, NO20100256, NO20080145 and NO20064102 all in the name of the applicant.

The control devices are complicated and expensive control units that are working under severe conditions regarding stress and harsh submarine conditions. They may collide with objects in the water or get entangled in lost fishing lines, fishing nets or other objects in the sea, thereby putting the whole seismic operation in jeopardy. A dysfunctional control device may take uncontrolled paths and collide with other instrumented elements leading to a worst case scenario of terminating the whole operation. A dysfunctional control device may also lead to entangling of several instrumented cables, thereby creating a real disaster for the seismic operation.

Naturally, a control device with operational problems will need to be serviced as fast as possible. This can be done by forcing the control device to the surface where it can be serviced by a workboat. This method of servicing will be much faster and much cheaper than reeling the whole instrumented cable on board in order to reach the control device in question.

There exist several different solutions for retrieval of instrumented cable/streamer which also will retrieve the control device to the surface together with the instrumented cable/streamer.

From U.S. Pat. No. 4,823,325 it is known a seismic streamer retrieval system which utilizes an inflatable bag to lift the streamer to the water surface where it can easily be recovered. An acoustical signal or a pressure switch is used to activate said device so as to cause the inflatable bag to be ejected from said device and inflated to lift the streamer to the water surface. A small electric motor and drill bit are used to puncture a gas cylinder to release gas into the inflatable bag. U.S. Pat. No. 4,823,325 describes a device which can be attached to the streamer by means of collar assemblies, accordingly, this is not a device arranged in-line the instrumented cable. Retrieval devices in accordance with this design suffer from a number of disadvantages. As the retrieval device is arranged exterior of the instrumented cable, and e.g. hang beneath the instrumented cable, they produce considerable noise as they are towed through the water, which noise will interfere with the reflected signals detected by the hydrophones in the instrumented cable. This solution will also be highly vulnerable in underwater operations, and will be exposed to damages by objects in the water. Also, the need of having several such devices arranged along the instrumented cable will complicate the retrieval and deployment of the instrumented cable from the vessel, as these device will have to be removed before the instrumented cable can be reeled onto a drum at the vessel, and will have to be arranged to the instrumented cable after the instrumented cable leaves the drum to be deployed into the water.

From U.S. Pat. No. 6,612,886 it is known an in-line cable retriever, which solves many of the mentioned problems with U.S. Pat. No. 4,823,325. U.S. Pat. No. 6,612,886 describes a retriever device for a marine seismic cable or other tool. The retriever device comprises a housing, in which housing is disposed a canister for containing gas under pressure. An inflatable bag is fluidly connected to the gas canister within the housing. Gas is prohibited from exiting the gas canister and inflating the bag until hydrostatic pressure acting upon the retriever device exceeds a designated amount. If the cable sinks to a certain depth within a water body, the corresponding hydrostatic pressure acting upon the cable will exceed a preset pressure level. An actuating mechanism is then actuated, causing gas to exit the gas canister and to inflate the inflatable bag. In one arrangement, a pop-open cover is provided on the housing. As the bag inflates, it acts to release the pop-open cover from the housing and to further inflate outside of the housing of the retriever. The inflated bag will cause the cable to be buoyantly lifted to the surface of the water body.

Even though U.S. Pat. No. 6,612,886 solves the problem of noise in relation to U.S. Pat. No. 4,823,325, it also introduces new problems. First of all, it is not arranged for remote controlling, resulting in that one is completely reliable on the pressure sensor for activation. Secondly, by the lack of remote control it will not be possible to bring the cable to the surface for maintenance of e.g. control devices with failure. Thirdly, the fact that this retriever device is arranged in-line the instrumented cable introduces increased risk of failure in the instrumented cable. The more connections, the more is the risk for leakage and damage of the instrumented cable. By that this retriever device is arranged in-line the instrumented cable, this also results in that the retriever device must be provided with means for continuing the electrical cables of the instrumented cable between the sections, accordingly introducing two new connection points for each retriever device.

Accordingly, this solution introduces a higher risk of instrumented cable failure due to e.g. leakage, and this solution will increase the costs due to the fact that one will need a number of such devices along an instrumented cable.

There exists today no control device for instrumented cables being provided with buoyancy means for buoyantly lifting the control device and instrumented cable to the surface if desired or needed.

Accordingly there is a need for a more operational viable and cost effective solution to retrieving a control device and instrumented cable (segment) to the surface for inspection and servicing.

There is also a need for a solution which makes it possible to exchange control device while the instrumented cable is still in the sea.

There is also a need for a solution of retrieving which does not increase the risk of danger for failure of the instrumented cable or control devices.

OBJECT

The main object of the present invention is to solve the above mentioned problems of prior art and identified needs.

It is further an object to provide a control device provided with buoyancy means for retrieving the control device and the instrumented cable (segment) to the surface if desired or needed.

It is further an object of the present invention to provide a control device provided with buoyancy means for retrieving which does not increase the risk of failure of the instrumented cable and/or control devices, and which will result in reduced cost for installation and operation compared to prior art.

SUMMARY

A control device for controlling an instrumented cable or cable array, such as a seismic streamer, is as mentioned above, well-known from, among others, the applicant's Norwegian patent applications NO 20080145, NO 20083830 and NO 20063182. The most of the prior art control devices are formed by a main body and at least two operable wings. Today there are used most in-line control devices, but also other solutions exists.

There exist solutions where power supply (batteries), control means, drive means and sensors are integrated in the wings of the control device, which wings easily can be attached and detached. Another solution that exists is where power supply (batteries), control means, drive means and sensors are integrated into motor and drive gear housings of the control device, which motor and drive gear housing forms a detachable unit which easily can be attached and detached.

Another common solution is a control device where power supply (batteries), control means, drive means and sensors are integrated in the main body of the control device.

The main body is preferably elongate and mainly tubular and which at its ends is provided with mechanical and electrical connection means to be arranged in series between two adjacent sections of an instrumented cable. Moreover, the main body is at adapted positions provided with fastening and connection means for smart wings, motor and drive gear housings provided with wings, or only wings, which main body is adapted to the respective alternatives. The wings are preferably arranged so that they are evenly distributed around the main body.

The control devices are mainly fed with energy via an energy line of the instrumented cable and provided with control signals via a control line of the instrumented cable.

According to the present invention the control device in addition to the above described features are provided with buoyancy means for retrieving the control device and the instrumented cable to the surface, at least sections (segments) of the instrumented cable. The buoyancy means for retrieving the control device and instrumented cable are preferably in the form of means for providing the control device with buoyancy.

The means for providing the control device with buoyancy can be arranged in several different ways, such as an integrated part of the control device or arranged as a device being adapted for connection to the control device.

By integrated part of the control device is meant that the buoyancy means are e.g. arranged in at least one of the wings of the control device, in motor and drive gear housings of the control device or arranged in the main body of the control device.

The buoyancy means are preferably arranged in a cavity in the wing, motor and drive gear housing or main body of the control device, which cavity is covered by a hatch, which hatch is remotely operable, pressure activated, timer activated or activated by the buoyancy means or similar. The buoyancy means is preferably an inflatable flexible bag or similar, such as a balloon, which can be provided with buoyant gas, i.e. a gas with lower density than water, to provide buoyancy for the control device in the water. It is further an advantage that the means for providing the inflatable bag or similar with buoyant gas have as small volume and mass as possible before they are activated and provide as much volume as possible after they are activated. The inflatable flexible bag or similar is arranged to and/or provided with means for providing the inflatable flexible bag or similar with buoyant gas, such as helium, hydrogen, nitrous oxide, oxygen, air or similar. The lower density the buoyant gas has in relation to the water the control device is in, the higher buoyancy is provided. The means for providing the inflatable flexible bag or similar with buoyant gas may e.g. be a gas ampulla which can be remotely operated or there can be arranged one or more chemical compounds or substances which will produce buoyant gas inside the inflatable flexible bag or similar, for thereby to inflate the inflatable flexible bag or similar and provide buoyancy for the control device. The means for providing the inflatable flexible bag or similar with buoyant gas are remotely operable, pressure activated and/or timer activated. It will be preferable to have several means for activation.

Preferably the means for providing the flexible bag or similar with buoyant gas can be activated by control signals from the vessel to the control device via the instrumented cable. If the control device is provided with means for wireless communication, the wireless communication can be used for activating the buoyancy means. Wireless communication can also be used if an instrumented cable section has failure, so that control signals cannot be provided via the instrumented cable.

In case of problems with the communication it would be preferable to also have an autonomous mode that can be activated either through a preset timer and/or by measuring the water pressure. If contact with a control device is lost due to instrumented cable failure or damage, cable loss or control device failure, a preset timer can activate the buoyancy means at a preset time after communication failure, thereby bringing both the instrumented cable and the control device to the surface. Moreover, if the control device is lost and sinks to a depth that is substantially deeper than the normal operational depth, a pressure activated switch may activate the buoyancy means which again brings the control device to the surface.

As mentioned above the buoyancy means for retrieving the control device and instrumented cable can also be arranged as a device which can be connected to the control device in a suitable manner. This can e.g. be a device adapted for being arranged in front of the control device or behind the control device, i.e. fixed to the control device and arranged between the control device and the instrumented cable. As mentioned above this device can be provided with a cavity and a hatch, in which cavity an inflatable flexible bag or similar can be arranged.

Examples of means for remotely operating the hatch and means for remotely operating the means for providing the inflatable flexible bag or similar with buoyant gas are a mechanical connection or in the form of wireless communication means, such as if the control device is provided with one or more acoustic transmitter/receiver elements (transducer) or only receiver elements.

By that the control device is provided with buoyancy means for retrieving the control device and instrumented cable to the surface, this means that the control device and instrumented cable can be retrieved to the surface when desired or needed. Retrieving the control device and instrumented cable to the surface can be desired when there is detected a failure in a control device or an instrumented cable/section of the instrumented cable. By retrieving the control device and instrumented cable to the surface, maintenance can be performed, wings of the control device can be replaced if necessary, the entire control device can be replaced, sections in the instrumented cable can be replaced, etc., which shows that the present invention will have great value.

The present invention can also be used together with retrieval devices arranged in-line the instrumented cable or retrieval devices clamped on the instrumented cable to provide the instrumented cable with further buoyancy means for retrieving the instrumented cable. These retrieval devices may e.g. be remotely operable, timer or pressure switch activated and be arranged for the purpose of bringing the entire instrumented cable to the surface.

Further advantageous details and features of the invention will appear from the following detailed description.

BRIEF DESCRIPTION OF THE DRAWINGS

The invention is in the following described in more details with reference to the drawings, where.

DETAILED DESCRIPTION

Reference is first made to FIGS. 1a-d which shows control devices according to the invention. The control device 10 according to the invention is preferably arranged to be connected in series between two adjacent cable sections of a multi-sectional instrumented cable, .i.e. in-line, but the present invention may also be implemented for control devices 10 not being arranged for in-line connection with the instrumented cable. For the further description of the present invention a control device 10 being arranged for in-line connection with the instrumented cable will be used.

Figure 1A:
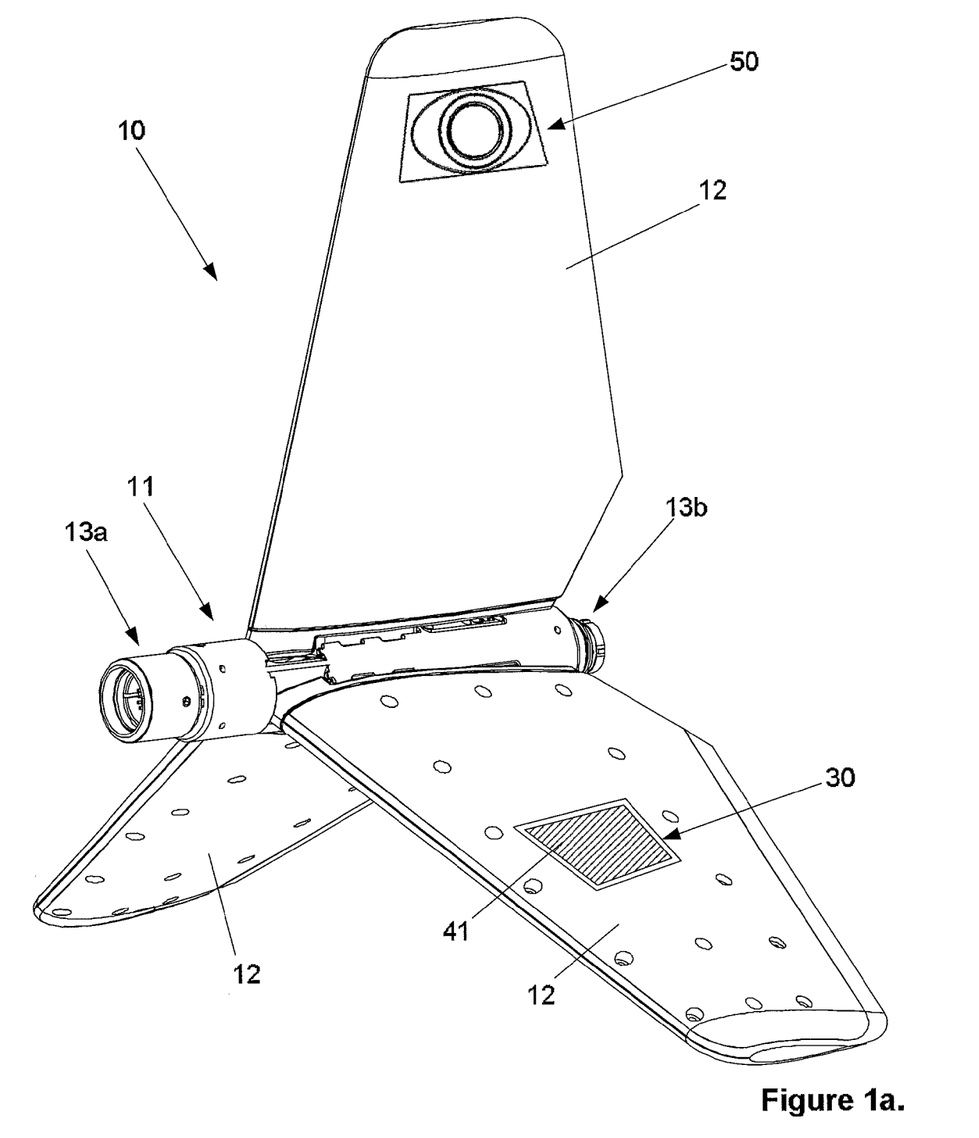
FIG. 1a shows a control device according to a first embodiment of the present invention.
Figure 1B:
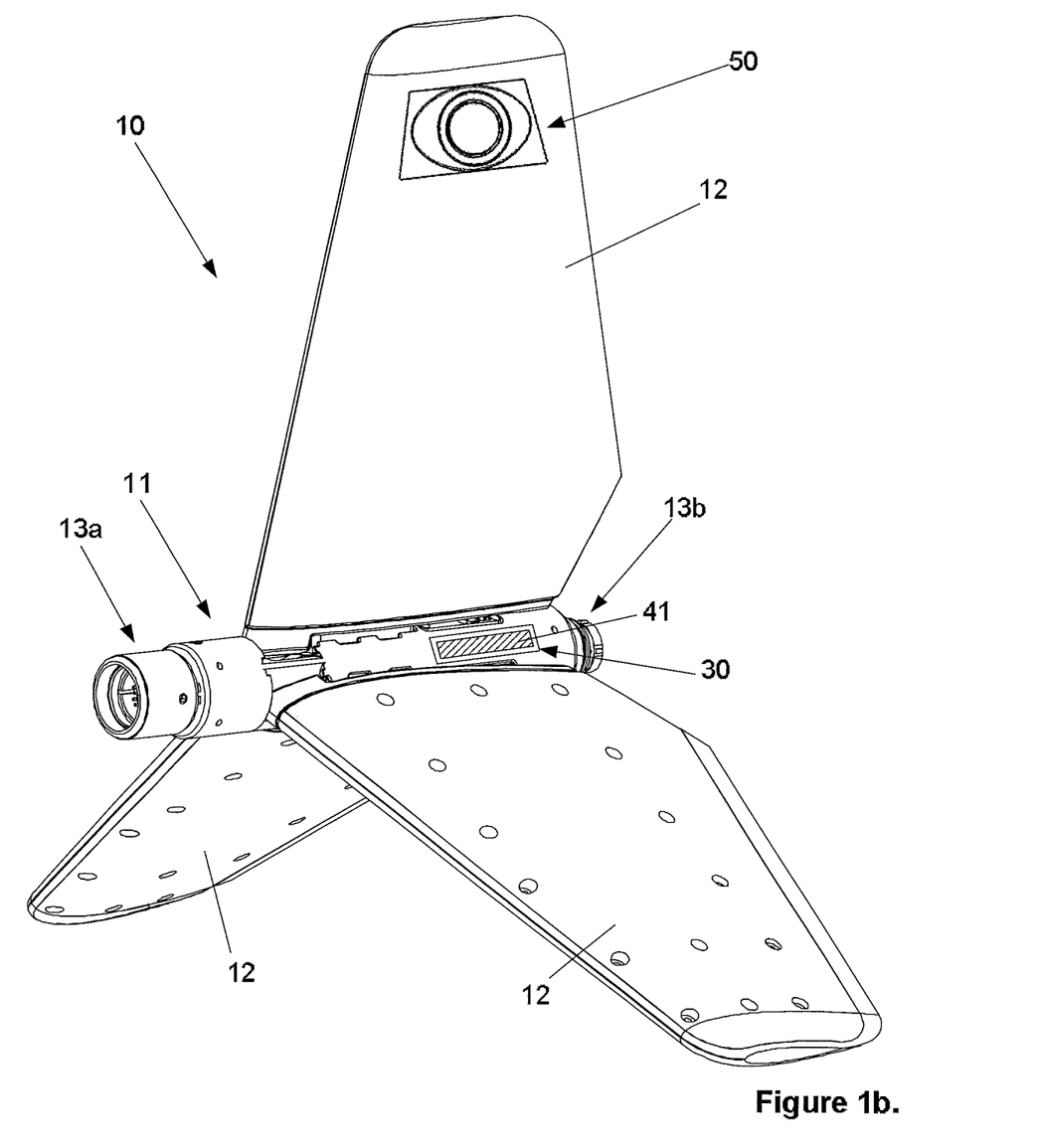
FIG. 1b shows a control device according to a second embodiment of the present invention.

The control device 10 in FIGS. 1a-b and d includes three similar wings 12, so-called smart wings (described above), which are evenly distributed about a main body 11, and is a so-called three axis bird.

Figure 1C:
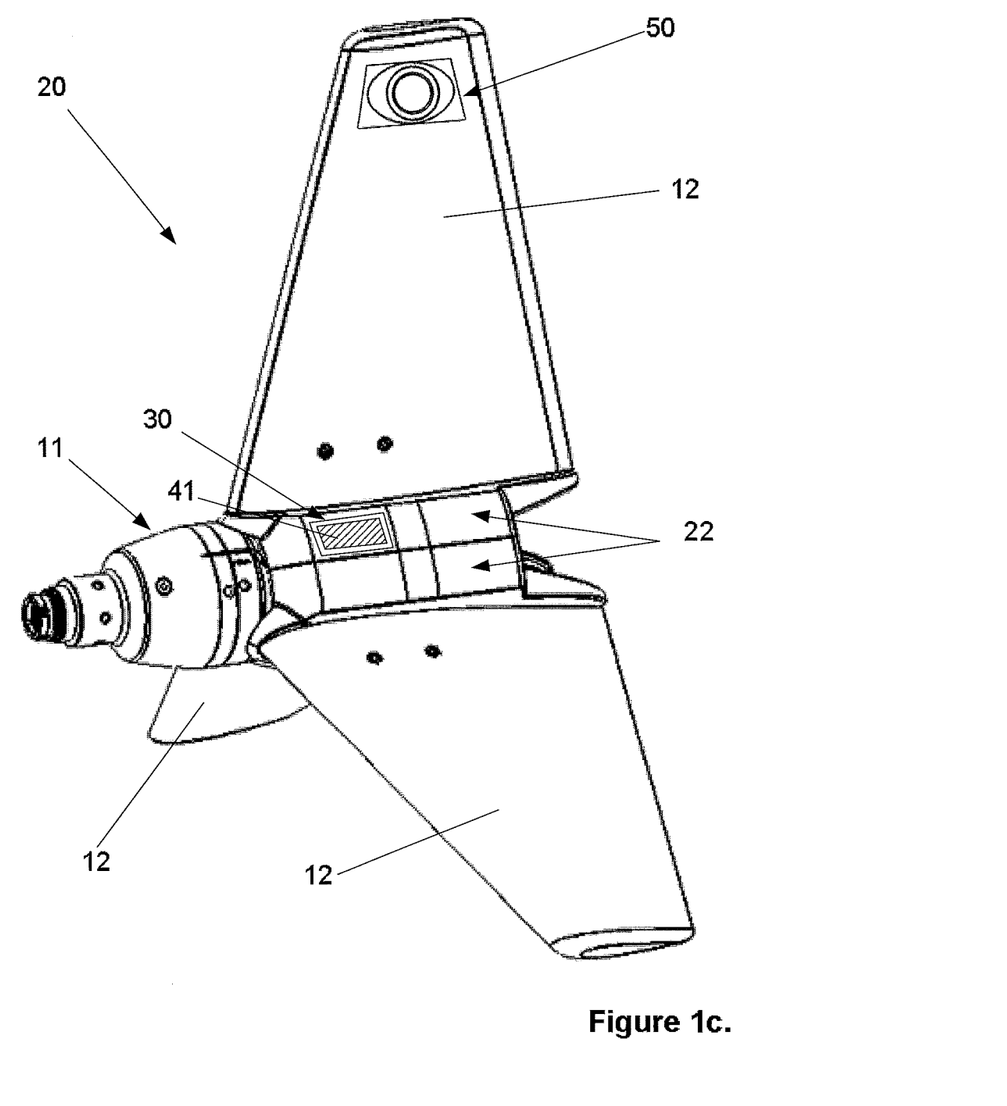
FIG. 1c shows a control device according to a third embodiment of the present invention.
Figure 1D:
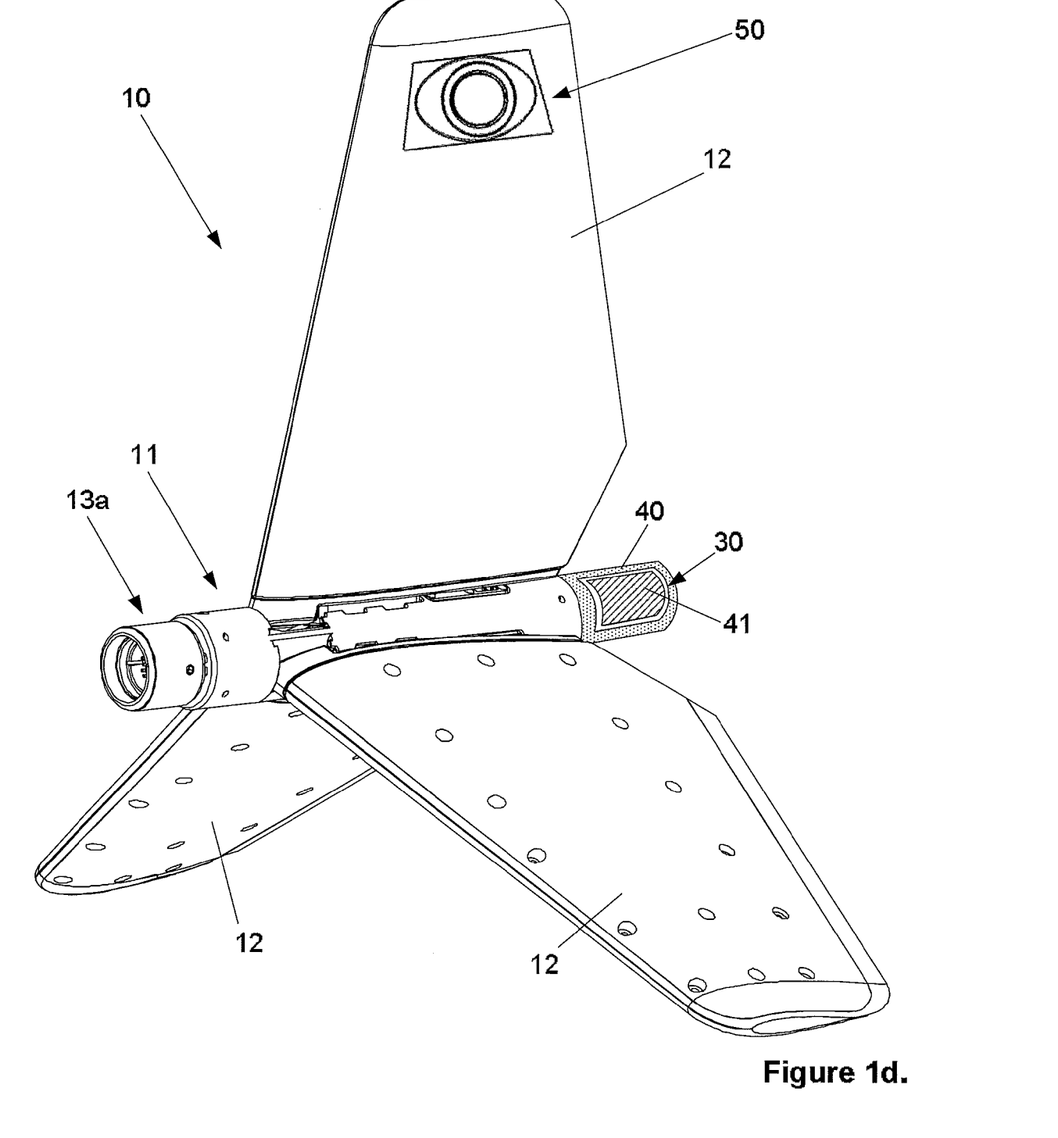
FIG. 1d shows a control device according to a fourth embodiment of the present invention.

In FIG. 1c it is shown another embodiment of a control device 20 which is formed by a main body 11 provided with detachable motor and drive gear housings 22 which again is provided with wings 12. The motor and drive gear housings 22 are arranged for connection to the energy line and power line through connections in the main body 11.

The main body 11 of the control device 10 is an elongated streamlined tubular housing, which at its ends include connection means 13a and 13b adapted for mechanical and electrical connection in series in a multi-sectional instrumented cable, of the kind being towed behind a seismic survey vessel. The connection means 13a and 13b are adapted to similar connection points (not shown) at each end of each instrumented cable section, which connection points usually are used for connecting two adjacent cable sections.

Moreover, the main body 11 includes specially designed attachment and connection means for connecting the smart wings 12 both mechanically and electrically. The main body 11 is provided with printed circuit cards and electronics for communication with an external control unit via the control line of the instrumented cable. The main body 11 is preferably arranged so that the feed-through of conductors between instrumented cable sections are separated from wing mechanisms, drive means, control means, sensors and acoustic means (described below). This is to avoid malfunction in case of mechanical damage of the control device, e.g. leakage.

The main body 11 further preferably includes a roll sensor (not shown) and/or a depth meter (not shown), preferably in the form of a pressure sensor.

Reference is now made to FIG. 1a which shows one embodiment of the control device 10. According to the first embodiment the control device 10 is provided with buoyancy means 30 for retrieving the control device 10 and instrumented cable (not shown) to the surface when desired or needed. According to the first embodiment, the buoyancy means 30 for retrieving the control device 10 and instrumented cable to the surface is arranged in at least one wing 12 of the control device 10. The buoyancy means 30 will be described in detail below.

Reference is now made to FIG. 1b which shows another embodiment of the control device 10 according to a second embodiment of the present invention. According to the second embodiment the control device 10 is provided with buoyancy means 30 for retrieving the control device 10 and instrumented cable to the surface in the main body 11 of the control device 10.

Reference is now made to FIG. 1c which shows a control device 20 according to a third embodiment of the present invention. According to the third embodiment the control device 20 is provided with buoyancy means 30 for retrieving the control device 20 and instrumented cable to the surface in motor and drive gear housing 22 of the control device 20. It should be mentioned that also such a control device 20 can be provided with buoyancy means 30 for retrieving the control device 20 in the wings 12, as shown in FIG. 1a.

Reference is now made to FIG. 1d which shows a fourth embodiment of the disclosed control device 10. This embodiment of the control device 10 is provided with buoyancy means 30 for retrieving the control device 10 and instrumented cable to the surface by a device 40 adapted for connection to the control device 10. In FIG. 1d, the device 40 is connected to the rear end of the control device 10, between the rear end of the control device 10 and the instrumented cable. It should also be mentioned that the buoyancy means 30 and the connection device 40 can be arranged in front of the control device 10, i.e. between the instrumented cable and the front end of the control device 10. It is also possible to have the buoyancy means 30 and connection device 40 both in front of and behind the control device 10.

It should be mentioned that all the above embodiments can be combined in order to provide a control device 10 having sufficient buoyancy to retrieve the control device 10 and instrumented cable to the surface.

Reference is now made to FIGS. 2a-e which show embodiments of buoyancy means 30 for retrieving the control device 10 and instrumented cable to the surface. The buoyancy means 30 includes an inflatable flexible bag 31 or similar, such as a balloon, which is securely fixed in the cavity or arranged securely to the cavity by means of a wire or similar. The flexible bag 31 or similar is arranged to and/or provided with means for providing the inflatable flexible bag 31 or similar with buoyant gas to provide the control device 10 with buoyancy. The inflatable flexible bag 31 may e.g. be manufactured from materials such as rubber, latex, polychloroprene, nylon fabric or similar.

Figure 2A:
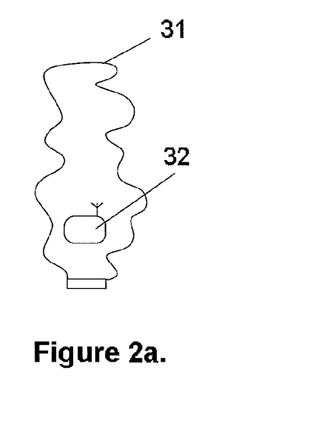
FIG. 2a-e show examples of means for providing the control device with buoyancy.

The means for providing the flexible bag 31 or similar with buoyant gas are, e.g. as shown in FIG. 2a, a gas ampulla 32, containing a gas, which gas ampulla 32 is arranged inside the inflatable flexible bag 31 and which preferably is remotely operable, or can be arranged outside the inflatable flexible bag 31 and connected to the flexible bag 31 via valve means.

Figure 2B:
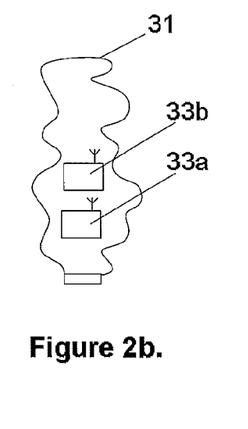

Another embodiment of means for providing the inflatable flexible bag 31 with buoyant gas are shown in FIG. 2b where two or more chemical compounds or substances, where one or both (all) of the compounds or substances are enclosed in one or more containers 33a-b which preferably are remotely operable to release the compounds or substances into the inflatable flexible bag 31. When the compounds or substances come into contact with each other in the inflatable flexible bag 31 they will react and create a buoyant gas.

Figure 2C:
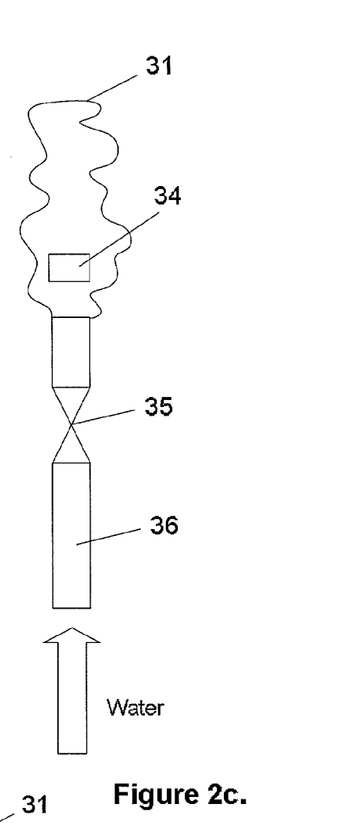

Another embodiment of means for providing the flexible bag 31 with buoyant gas is shown in FIG. 2c where at least one chemical compound or substance 34 is arranged inside the flexible bag 31 and where a valve 35 and pipelines 36 are arranged for allowing water surrounding the control device 10, 20 to flow into the inflatable flexible bag 31 to react with the at least one compound or substance 34 to create buoyant gas. Also here the at least one compound or substance 34 may be enclosed in a container which is remotely operable, to ensure that buoyant gas is not produced unintentionally or as a cause of a failure/error.

Figure 2D:
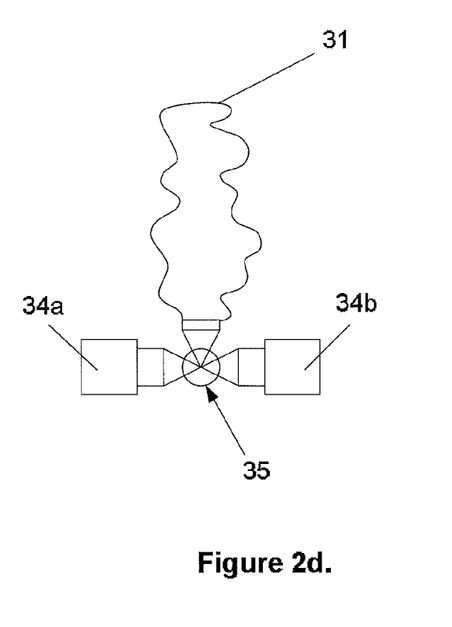

Yet another embodiment is shown in FIG. 2d which shows a solution where the means for providing the inflatable flexible bag 31 with buoyant gas includes a mixing valve 35 for mixing and supplying at least two compounds, substances or gases 34a-b into the flexible bag 31, which compounds, substances or gases 34a-b will react and produce buoyant gas. The compounds, substances or gases 34 are preferably arranged in containers being remotely operable and the valve 35 is also preferably remotely operable.

Figure 2E:
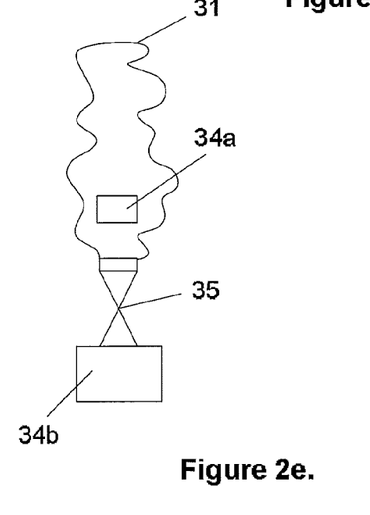

Yet another embodiment of means for providing the inflatable flexible bag 31 with buoyant gas is shown in FIG. 2e where at least one chemical compound or substance 34a is arranged inside the inflatable flexible bag 31 and where a valve 35 is arranged for allowing gas or fluid 34b from a container to flow into the inflatable flexible bag 31 to react with the at least one compound or substance 34a to create buoyant gas. Also here the at least one compound or substance 34a may be enclosed in a container which is remotely operable, to ensure that buoyant gas is not produced unintentionally or as a cause of a failure/error.

It should be mentioned that for all solution shown not having a valve, the inflatable flexible bag 31 or similar is preferably entirely closed so that the buoyant gas cannot escape from the inflatable flexible bag 31 or similar.

The above described embodiments of means for providing buoyant gas can be combined in a single control device to form suitable embodiments.

Figure 3:
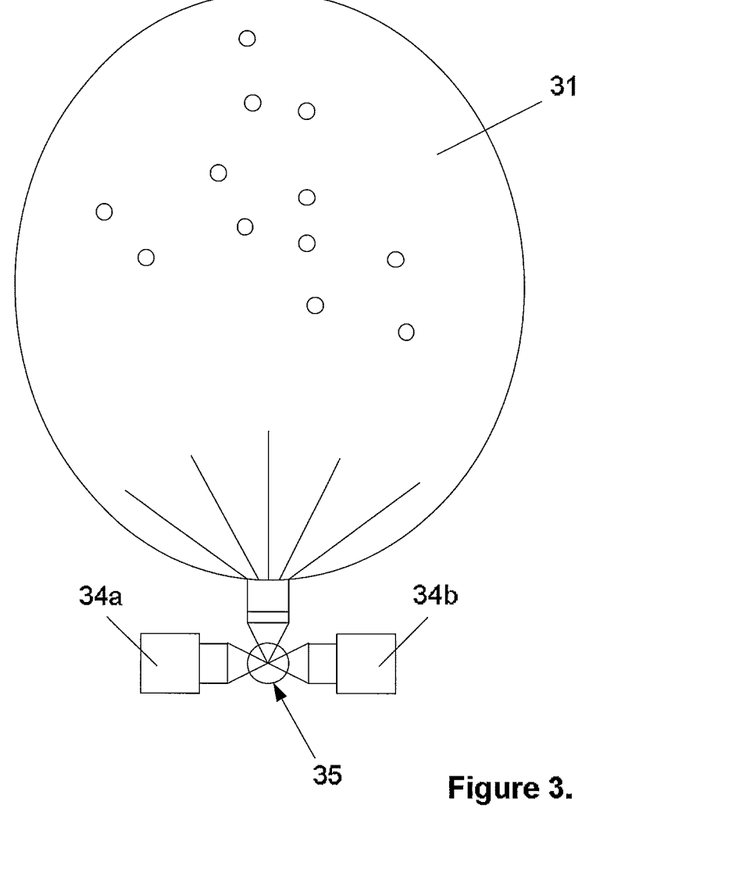
FIG. 3 shows an example of FIG. 2d in inflated state.

Reference is now made to FIG. 3 which shows a state of FIG. 2d where the inflatable flexible bag 31 is inflated after the buoyant gas has been created.

Accordingly, there may be arranged compounds, substances, gases or liquids in the inflatable flexible bag or similar, in containers inside the inflatable flexible bag or similar or outside the inflatable flexible bag or similar and connected to the inflatable flexible bag, or a combination of these, which can be activated to create buoyant gas in the inflatable flexible bag or similar to retrieve the control device 10, 20 and instrumented cable to the surface.

In case the control device 10, 20 is provided with acoustic communication means 50, such as acoustic transmitter/receiver elements (transducer) or only receiver elements, these means can be used for activating the buoyancy means 30. The control device can also be provided with separate wireless communication means for activation of the buoyancy means 30.

Other types of activation of the buoyancy means 30 are by pressure activated or timer activated. E.g. a pressure sensor can be arranged in the main body 11 of the control device 10, 20 be used for activation or a dedicated pressure sensor can be used for activation. A timer is another alternative for activation of the buoyancy means 30, which will be suitable if all other communication means fails.

As shown in the Figures, the buoyancy means 30 are arranged in a cavity in the control device 10, 20 or in a device 40 arranged for being connected to the control device 10, 20. The cavity is preferably closed with a remotely operable hatch 41, which can be opened when the buoyancy means 30 are activated. The hatch 41 may e.g. be spring operated such that when a lock is opened by activation of the buoyancy means 30, the spring will force the hatch 41 to open, allowing the inflatable flexible bag 31 or similar to extend out of the cavity. It should be mentioned that the inflatable flexible bag 31 or similar preferably is securely fixed in the cavity or securely fixed by a wire or similar for retaining the inflatable flexible bag 31 after the hatch 41 is opened.

The above mentioned valve means 35 are arranged to a control unit, either a separate control unit for this or the control unit of the control device. If the control device is provided with acoustic means for communication, this can also be used to activate the buoyancy means 30 and valve 35. If the control device is provided with wireless communication means, these can also be used to activate buoyancy means 30 and valve 35.

It should be pointed out that all the above shown embodiments may be combined to provide the control device 10, 20 with several buoyancy means 30 for retrieving the control device and instrumented cable. Due to that the control device 10, 20 has limited space available for arranging the buoyancy means 30 for retrieving the control device and instrumented cable, it would in many cases be necessary to arrange several buoyancy means 30, e.g. in several of the wings 12, or both in wings 12 and main body 11 of the control device, or as device 40 connected to the control device 10, 20 and wings 12 and/or main body 11.

In this way it can be ensured that sufficient buoyancy is provided for buoyantly lifting the control device 10, 20 and instrumented cable to the surface, at least sections of the instrumented cable.

As described above the buoyancy means 30 can either be manually activated by a control signal from the vessel via the instrumented cable or via acoustic communication, or autonomous by e.g. a pressure sensor or timer. In this way it is ensured that the control device and instrumented cable can be retrieved at any situation.

In cases where the wings of the control device is not a smartwing, the entire wing can be used to house the inflatable flexible bag or similar. In such a solution a large part of the wing is arranged to be opened or one side of the wing can be opened to allow the bag to exit from the wing.

A wing not being a smartwing can also be used as a buoyant element, i.e. a buoyant gas can be released into an airtight wing so that the wing works as the buoyant element.

The described device 40 for connection to the control device 10, 20, may also be arranged for connection between instrumented cable sections, i.e. not in connection with a control device. In such a case the device 40 is preferably provided with proper means for activation of the buoyancy means 20.

The invention claimed is:

1. A control device (10) for controlling the position of an instrumented cable towed in water having a surface, individually in relation to other instrumented cables or with additional instrumented cables together as a cable array to counteract cross currents or other dynamic forces which affect a towed array behind a seismic survey vessel, the control device (10) includes a main body (11) and independent, detachable, controllable wings (12), wherein the control device (10) is provided with buoyancy means (30) for retrieving the control device (10) and at least a portion of the instrumented cable or the detachable wings (12) to the surface from a depth below the surface, which buoyancy means (30) are arranged for providing the control device (10) with buoyancy, which control device (10) is arranged for connection in-line with the instrumented cable between two sections of the instrumented cable, wherein
the buoyancy means (30) is arranged in a cavity in at least one of the detachable wings (12) of the control device (10).

2. The control device of claim 1, wherein the buoyancy means (30) includes an inflatable flexible bag (31) or balloon which is arranged to expand out of the control device (10).

3. The control device of claim 1, wherein the buoyancy means (30) includes at least one compound, substance, gas or liquid (34, 34a-b) for providing a buoyant gas in the inflatable flexible bag (31) or balloon.

4. The control device of claim 1, wherein the buoyancy means (30) are remotely operable, pressure activated, timer activated, activated by control signals in the instrumented cable, or activated by acoustic communication.

5. The control device of claim 1, wherein the buoyancy means (30) are arranged in a cavity arranged in at least two wings (12) of the control device (10).

6. The control device of claim 1, wherein the buoyancy means (30) are integrated in a cavity arranged in the main body (11) of the control device (10).

7. The control device of claim 1, wherein the buoyancy means (30) are arranged in a cavity arranged in the device (40) adapted for being connected to the control device (10).

8. The control device of claim 5, wherein the cavity is closed by a hatch (41), which hatch (41) is remotely operable, pressure activated, timer activated or activated by the buoyancy means (30).

9. The control device of claim 6, wherein the cavity is closed by a hatch (41), which hatch (41) is remotely operable, pressure activated, timer activated or activated by the buoyancy means (30).

10. The control device of claim 1, wherein the cavity is closed by a hatch (41), which hatch (41) is remotely operable, pressure activated, timer activated or activated by the buoyancy means (30).

11. The control device of claim 8, wherein the cavity is closed by a hatch (41), which hatch (41) is remotely operable, pressure activated, timer activated or activated by the buoyancy means (30).

12. The control device of claim 3, wherein at least one compound, substance, gas or liquid (34, 34a-b) is arranged inside the inflatable flexible bag (31) or balloon.

13. The control device of claim 3, wherein at least one compound, substance, gas or liquid (34, 34a-b) is arranged in containers inside the inflatable flexible bag (31) or balloon.

14. The control device of claim 3, wherein at least one compound, substance, gas or liquid (34, 34a-b) is arranged outside and connected to the inflatable flexible bag (31) or balloon.

15. The control device of claim 3, wherein the at least one compound, substance, gas or liquid (34, 34a-b) is arranged in one or more of the configurations chosen from the group consisting of: inside the inflatable flexible bag (31) or balloon, in containers inside the inflatable flexible bag (31) or balloon and outside and connected to the inflatable flexible bag (31) or balloon.

16. The control device of claim 1, wherein the inflatable flexible bag (31) or balloon is securely fixed in the cavity.

17. The control device of claim 1, wherein the buoyancy means (30) are arranged in a cavity arranged in all wings (12) of the control device (10).

* * * * *

UNITED STATES PATENT AND TRADEMARK OFFICE
CERTIFICATE OF CORRECTION

| | | |
|---|---|---|
| PATENT NO. | : 9,290,239 B2 | Page 1 of 1 |
| APPLICATION NO. | : 13/768384 | |
| DATED | : March 22, 2016 | |
| INVENTOR(S) | : Arne Rinnan | |

It is certified that error appears in the above-identified patent and that said Letters Patent is hereby corrected as shown below:

In the Claims

Column 10, line 27:
Delete "8" and insert --7--

Signed and Sealed this
Fourteenth Day of June, 2016

Michelle K. Lee
*Director of the United States Patent and Trademark Office*